US009706097B2

(12) United States Patent
Kawahara (10) Patent No.: US 9,706,097 B2
(45) Date of Patent: Jul. 11, 2017

(54) IMAGE PICKUP APPARATUS (71) Applicant: CANON KABUSHIKI KAISHA, Tokyo (JP)

(72) Inventor: Hitoshi Kawahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 14/951,842

(22) Filed: Nov. 25, 2015

(65) Prior Publication Data
US 2016/0156821 A1 Jun. 2, 2016

(30) Foreign Application Priority Data

Dec. 2, 2014 (JP) ................. 2014-243689

(51) Int. Cl.
H04N 5/225 (2006.01)
G03B 15/04 (2006.01)
F21K 5/06 (2006.01)

(52) U.S. Cl.
CPC ....... H04N 5/2256 (2013.01); G03B 15/0442 (2013.01); H04N 5/2252 (2013.01)

(58) Field of Classification Search
CPC .. H04N 5/2251; H04N 5/2252; H04N 5/2256; H04N 5/2354; G03B 15/0442; G03B 15/05
See application file for complete search history.

(56) References Cited

U.S. PATENT DOCUMENTS

| 6,734,902 | B1 | 5/2004 | Kawahara |
| 9,560,251 | B2* | 1/2017 | Doshin ................ H04N 5/2256 |
| 2007/0177863 | A1* | 8/2007 | Ishikawa ............ G03B 15/0442 396/177 |
| 2009/0103911 | A1 | 4/2009 | Ikemizo et al. |
| 2012/0182465 | A1* | 7/2012 | Lin ...................... H04N 5/2256 348/371 |

FOREIGN PATENT DOCUMENTS

JP 2009-116321 A 5/2009

* cited by examiner

Primary Examiner — Daniel M Pasiewicz
(74) Attorney, Agent, or Firm — Fitzpatrick, Cella, Harper & Scinto (57) ABSTRACT An image pickup apparatus that comprises a mechanism that causes a light emitting unit for illuminating to move from a storage position at which the light emitting unit is housed in the apparatus body to a light emission enabled position at which the light emitting unit protrudes outside of the apparatus body is provided. The image pickup apparatus comprises a holding member that holds the light emitting unit; a trigger coil that is provided at the light emitting unit; and a magnetic member that is held by the holding member. The magnetic member is arranged adjacent to the trigger coil so that a direction of a magnetic field of the magnetic member is not a direction opposite to a direction generated in the trigger coil by a first wave of a voltage input to the trigger coil.

7 Claims, 7 Drawing Sheets

IMAGE PICKUP APPARATUS

BACKGROUND OF THE INVENTION

Field of the Invention

The invention relates to an image pickup apparatus mounted with a built-in strobe that is pop-up enabled.

Description of the Related Art

There is an image pickup apparatus such as a digital camera in which a tip of a photographing lens protrudes at the object side from the image pickup apparatus body more than a light emitting unit of the built-in strobe. There is a pop-up mechanism of the light emitting unit serving as a mechanism that prevents irradiating light toward the object from the light emitting unit from being blocked by the tip of the photographing lens. The pop-up mechanism moves the light emitting unit to a position where the light emitting unit protrudes from a storage position where the light emitting unit is housed in the image pickup apparatus body so as to prevent the photographing lens to enter within a range of the light produced by the light emitting unit.

In the image pickup apparatus comprising the pop-up mechanism of the light emitting unit, if the light emitting unit emits the light at the position where the light emitting unit is housed in the image pickup apparatus body, that is, if the light emitting unit emits the light in the storage casing of the digital camera, a surface and the like of the light emitting unit may be melted by the heat generated during the light emission. Japanese Patent Application Laid-Open No. 2009-116321 discloses an image pickup apparatus that comprises a Hall element provided on the image pickup apparatus body and a magnet provided on a moveable strobe device. The magnet is used for detecting whether or not the strobe device has popped-up.

In the image pickup apparatus disclosed in Japanese Patent Application Laid-Open No. 2009-116321, if the magnet is arranged closed to a trigger coil applying a trigger voltage to a xenon tube that is a light source of the strobe, a magnetic field of the magnet effects the trigger voltage output by the trigger coil to thereby a light-emitting failure of the strobe occurs.

SUMMARY OF THE INVENTION

The invention provides an image pickup apparatus that can prevent the occurrence of light emission failure due to an effect of the magnetic field of the magnet provided on the light emitting unit.

According to the invention, an image pickup apparatus that comprises a mechanism, which causes a light emitting unit for illuminating to move from a storage position at which the light emitting unit is housed in the apparatus body to a light emission enabled position at which the light emitting unit is protruded outside of the apparatus body, is provided that includes a holding member that holds the light emitting unit; a trigger coil that is provided at the light emitting unit; and a magnetic member that is held by the holding member, wherein the magnetic member is arranged adjacent to the trigger coil so that a direction of a magnetic field of the magnetic member is not a direction opposite to a direction generated in the trigger coil by a first wave of a voltage input to the trigger coil.

According to the invention, an image pickup apparatus that can prevent the occurrence of light emission failure due to an effect of the magnetic field of the magnet provided on the light emitting unit can be provided.

Further features of the invention will become apparent from the following description of exemplary embodiments with reference to the attached drawings.

DESCRIPTION OF THE EMBODIMENTS

Hereinafter, preferred embodiments of the invention will be described with reference to the drawings.

Figure 1A:
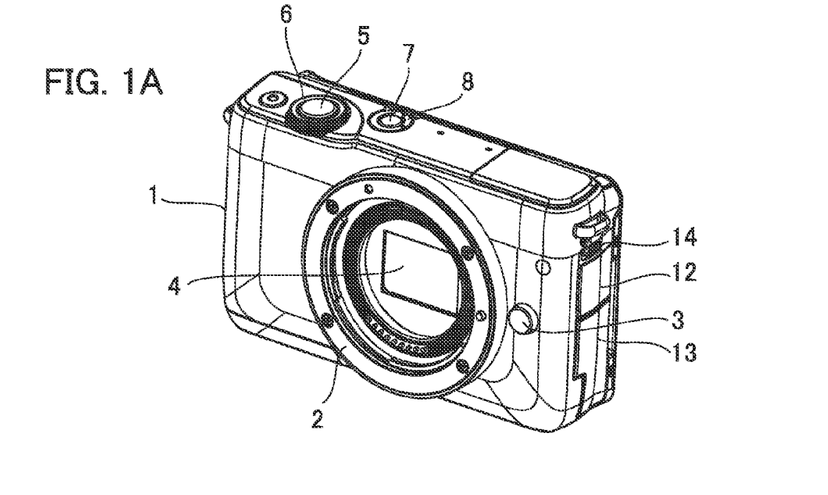
FIGS. 1A to 1C are perspective views illustrating an exterior appearance of a digital camera.
Figure 1B:
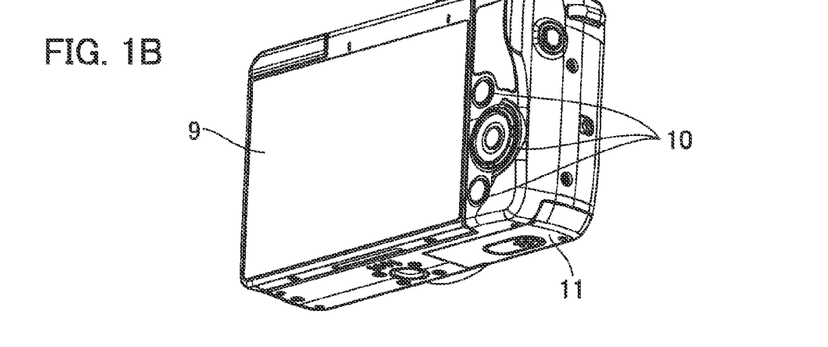
Figure 1C:
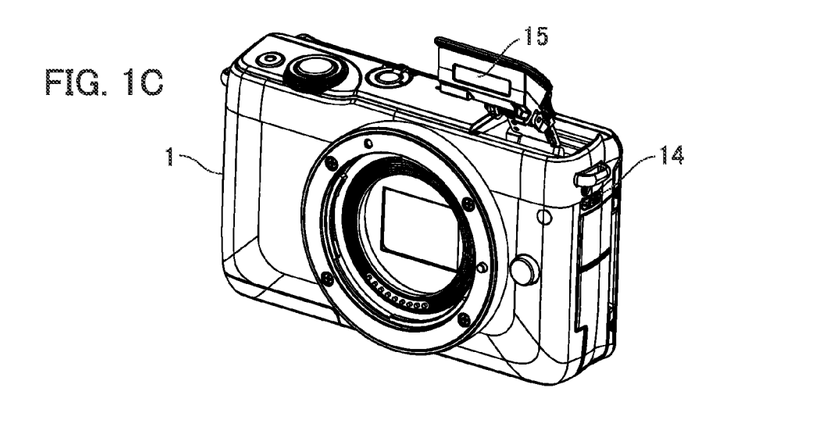

FIGS. 1A to 1C are diagrams illustrating an exterior appearance of a digital camera 1 that is an image pickup apparatus according to the present embodiment. FIGS. 1A and 1C are perspective views illustrating an apparatus body of the image pickup apparatus (the camera body) as viewed from a front side (an object side). FIG. 1B is a perspective view illustrating the apparatus body as viewed from a back side. FIGS. 1A and 1B illustrate a state in which a strobe light emitting unit, which is a light emitting unit for illumination, is in a storage position where the strobe light emitting unit is housed in the apparatus body. FIG. 1C illustrates a state where the strobe light emitting unit is in a light emission enabled position where the strobe light emitting unit is protruded from the apparatus body.

The digital camera 1 is configured by an interchangeable lens type, and has a bayonet type lens mount 2 on the front of the casing. An interchangeable type lens device (not illustrated) is mounted by fitting and rotating the lens device to the lens mount 2 while a user matches indicators that are printed on the lens device and the lens mount 2 respectively to each other. In addition, the user can remove the lens device by rotating the lens device in an opposite direction in the case where the lens device is mounted while the user presses a lens release button 3 adjacent to the lens mount 2.

An imaging element 4 is mounted in the casing of the digital camera 1, and photoelectrically converts an optical image imaged by the lens device and outputs an imaging signal. For example, the imaging element 4 may be a CCD (charge-coupled device) type imaging sensor or a CMOS (complementary metal-oxide semiconductor) type imaging sensor. The imaging signal output by the imaging element 4 is converted to digital information by a processing circuit of a signal processing board (not illustrated) mounted in the digital camera 1. A storage medium slot including a card I/F (interface) and the like, an image pickup processing unit, an image processing unit, a system control unit, a serial I/F unit, and the like are mounted on the signal processing board.

A release button 5 is provided on the upper surface for carrying out instructions for imaging preparation and imaging operation. The release button 5 is capable of a two stage pressing operation. When the user performs a half pressing operation of the release button 5, imaging preparing operation (a photometric operation, a distance measuring operation, and the like) is started. When the user performs a full pressing operation of the release button 5, the photographing and a recording processing are performed. Image data of the photographed object image is recorded in the storage medium mounted in the camera body.

An electronic dial 6 is arranged on the outer periphery of the release button 5. The user performs the operation of changing various photographing conditions by rotating the electronic dial 6 with respect to the release button 5. A power button 7 is arranged on the side of the release button 5 and is used when the user performs an ON operation and OFF operation of the power of the digital camera 1. A mode lever 8 is provided on the outer periphery of the power button 7. The user performs the operation of changing various photographing modes by rotating the mode lever 8 with respect to the power button 7 5. The index corresponding to the various photographing modes (not illustrated) is printed in proximity to the mode lever 8. The user can set the photographing mode corresponding to the index by matching the mode lever 8 to the position of the index.

A liquid crystal display unit 9 is provided on the rear of the casing of the digital camera 1. The liquid crystal display unit 9 displays a through-the-lens-image before photographing, a photographed image, information of various kinds of photographing conditions, and the like on a screen. A touch sensor is incorporated in the liquid crystal display unit 9, and the touch sensor is used when the user selects the function for changing the photographing parameters and the display format of the liquid crystal display unit 9. In addition, the liquid crystal display unit 9 is rotatable in a range of 180° with respect to a rotation axis provided on the top of the casing of the digital camera 1. In this manner, the visibility of the liquid crystal display unit 9 from the top side of the casing and the front side of the casing is improved. An operation button group 10 provided on the rear of the casing of the digital camera 1 is used when the user selects the function for changing the photographing condition and the display format of the liquid crystal display unit 9. A battery lid 11 arranged on the bottom of the casing of the digital camera 1 is an openable and closable lid member that covers a battery chamber. The user opens the battery lid 11 to thereby open the battery chamber, and an insertion and removal of the battery is possible.

A connector cover 12 is arranged on a side surface of the digital camera 1. The connector cover 12 protects the different types of terminals mounted on a printed circuit board for connecting with various external devices. In the present embodiment, the connector cover 12 comprises at least one of an analog video terminal for connecting to an external video device, a power terminal for connecting to an external DC power supply, a digital terminal for connecting to an information processing apparatus. For example, the external video device is a television receiver and the information processing apparatus is a PC (personal computer).

A storage medium lid 13 is arranged on a bottom of the connector cover 12. The storage medium lid 13 is an openable and closable lid member that covers a medium chamber of the storage medium lid 13. The user opens the storage medium lid 13 to thereby open the medium chamber, and the insertion and removal of the storage medium lid 13 is possible. A popup lever 14 is arranged on the top of the connector cover 12. If the user slides the popup lever 14 toward the front direction of the casing of the digital camera 1, a strobe light emitting unit 15 will protrude upward as shown in FIG. 1C. That is, by a popup mechanism as described below, a popup operation of the strobe light emitting unit 15 is performed and the strobe light emitting unit 15 is exposed to the outside. In this state, the user pushes down the strobe light emitting unit 15, and thereby, the strobe light emitting unit 15 is housed in the casing of the digital camera 1.

Figure 2A:
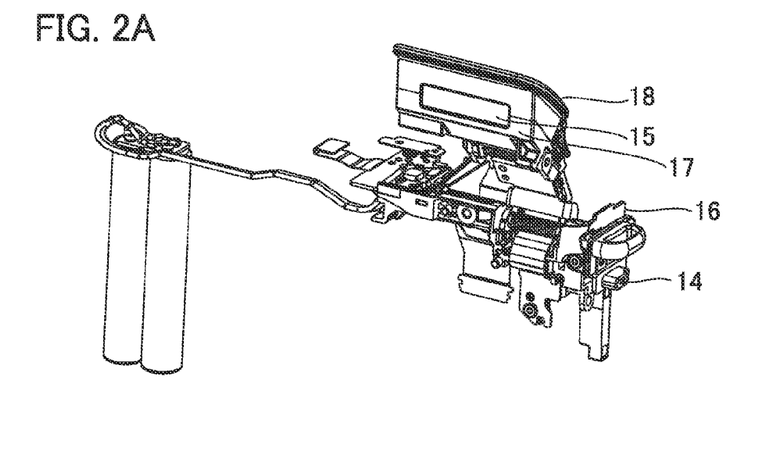
FIG. 2A is a perspective view illustrating a strobe unit.
Figure 2B:
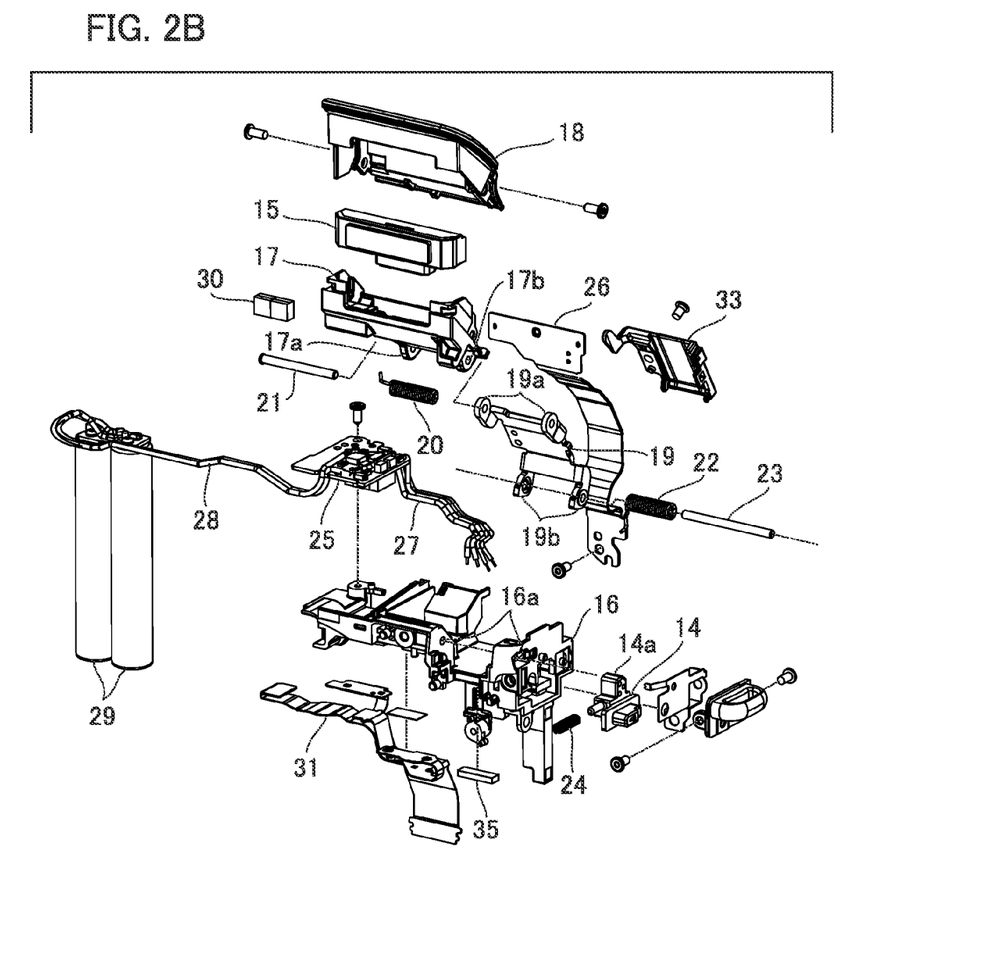
FIG. 2B is an exploded perspective view illustrating the strobe unit.
Figure 3:
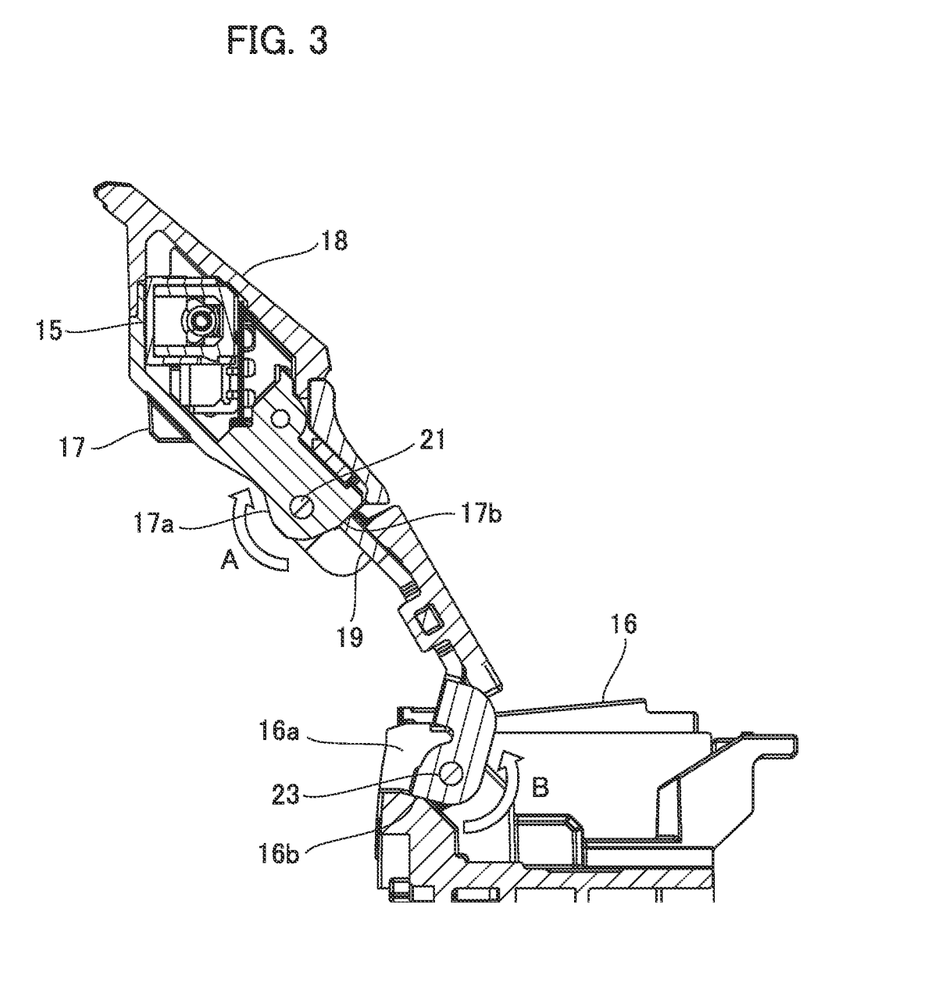
FIG. 3 is a cross-sectional view illustrating the strobe unit.

Next, the popup mechanism of the strobe light emitting unit 15 will be described with reference to FIGS. 2A, 2B, and 3. FIG. 2A is a perspective view illustrating a strobe unit including the strobe light emitting unit 15 and the popup mechanism. FIG. 2B is an exploded perspective view illustrating the strobe unit. FIG. 3 is a cross-sectional view illustrating the strobe unit in the state where the strobe light emitting unit 15 is popped-up. A base member 16 of the strobe unit is positioned inside the casing of the digital camera 1 and is fastened by screws.

The strobe light emitting unit 15 is held and integrally fixed by two screws between a strobe holder (a holding unit) 17 and a strobe cover 18, and the three members are integrally moved. A bearing portion 17a is formed on the strobe holder 17. One end portion 19a of an arm member 19 and a holder spring 20 are attached to the bearing portion 17a by inserting a holder shaft 21. Each end of the holder spring 20 is abutted against the strobe holder 17 and the arm member 19, respectively, and biasing force of the holder spring 20 acts therebetween in the direction of arrow A in FIG. 3. The strobe holder 17 is rotates against the arm member 19 with respect to the holder shaft 21 until abutting against a stopper portion 17b on the arm member 19 by the biasing force of the holder spring 20.

A bearing portion 16a is formed on the base member 16. The other end 19b of the arm member 19 and a base spring 22 are attached to the bearing portion 16a by inserting a base shaft 23. Each end of the base spring 22 is abutted against the base member 16 and the arm member 19, respectively, and biasing force of the base spring 22 acts therebetween in the direction of arrow B in FIG. 3. The arm member 19 is rotates against the base member 16 with respect to the base shaft 23 until abutting against a stopper portion 16b on the arm member 19 by the biasing force of the base spring 22.

The strobe holder 17 performs the pop-up operation with respect to the base member 16 by combining the above two rotations in the pop-up mechanism. Note that the angles of two rotations are adjusted so that the strobe light emitting unit 15 faces the object side while popped-up.

Figure 4A:
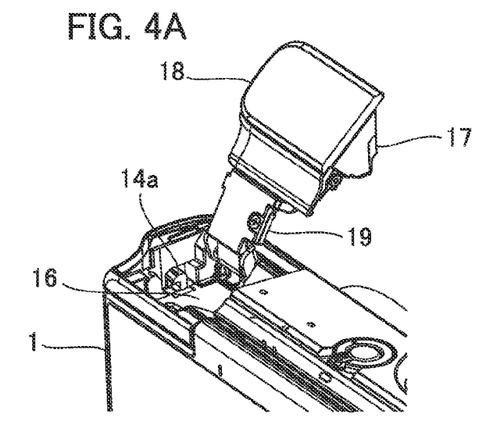
FIGS. 4A to 4D are schematic views illustrating a state in which the strobe unit is housed and held.
Figure 4B:
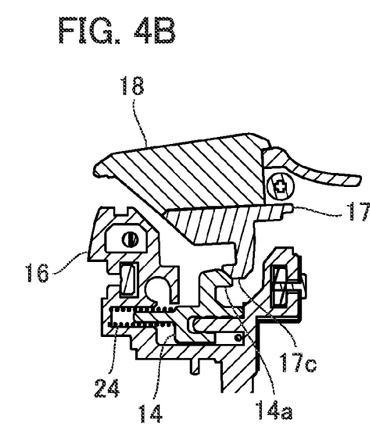
Figure 4C:
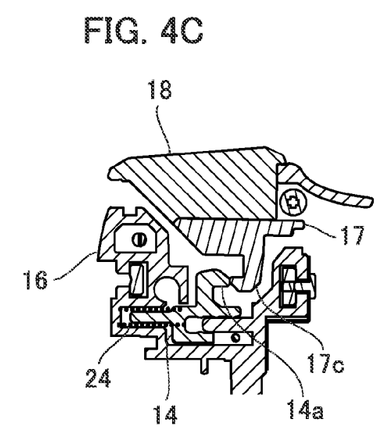
Figure 4D:
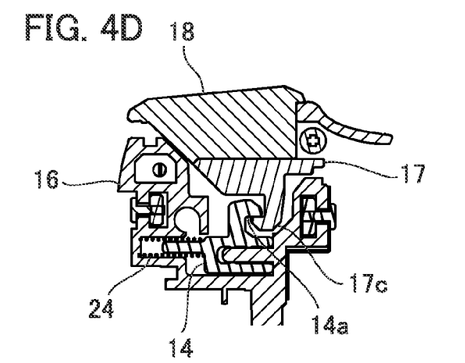

Next, the method for storing and holding the strobe holder 17 in the case of the digital camera 1 will be described with reference to FIGS. 4A to 4D. FIG. 4A is a perspective view illustrating the strobe unit in view from the rear side. FIGS. 4B to 4D are cross-sectional views illustrating the strobe unit in different states.

As shown in FIG. 2B, the popup lever 14 is incorporated in the base member 16 from the side of the digital camera 1 and is prevented from slipping out with another member assembled afterwards. The popup lever 14 is urged toward the back of the digital camera 1. As shown in FIG. 4A, a hook portion 14a formed on the popup lever 14 is arranged so as to be exposed at the storage portion of the strobe holder 17 formed on the digital camera 1.

The user performs the operation of pressing down the strobe holder 17 in the direction opposed to each biasing force of the holder spring 20 and the base spring 22 when the strobe is housed. As shown in FIG. 4B, an inclined surface portion of a hook portion 17c formed on the strobe holder 17 abuts against an inclined surface portion of a hook portion 14a. When the user further pushes down the strobe holder 17, the hook portion 17c moves the popup lever 14 toward the front of the digital camera 1 as shown in FIG. 4C. Then, when the hook portion 17c moves over the tip of the hook portion 14a, the popup lever 14 returns to the original position by the biasing force of the lever spring 24 as shown in FIG. 4D. The strobe holder 17 is held at the storage position by engaging the hook portion 17c and the hook portion 14a with each other.

On the other hand, when the user operates the popup lever 14 toward the front of the digital camera 1, the hook portion 17c is disengaged from the hook portion 14a. In a state in which the engagement of both hook portion is released, the strobe holder 17 performs the popup operation again.

Figure 5A:
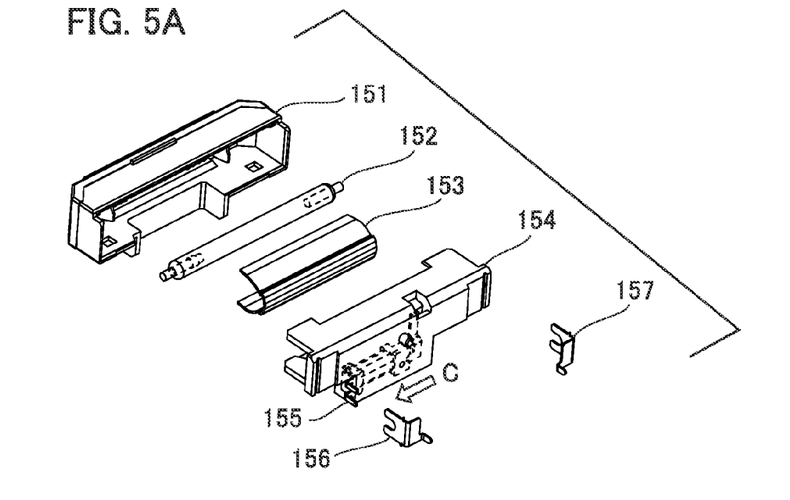
FIGS. 5A and 5B are schematic views illustrating a strobe light-emitting unit.
Figure 5B:
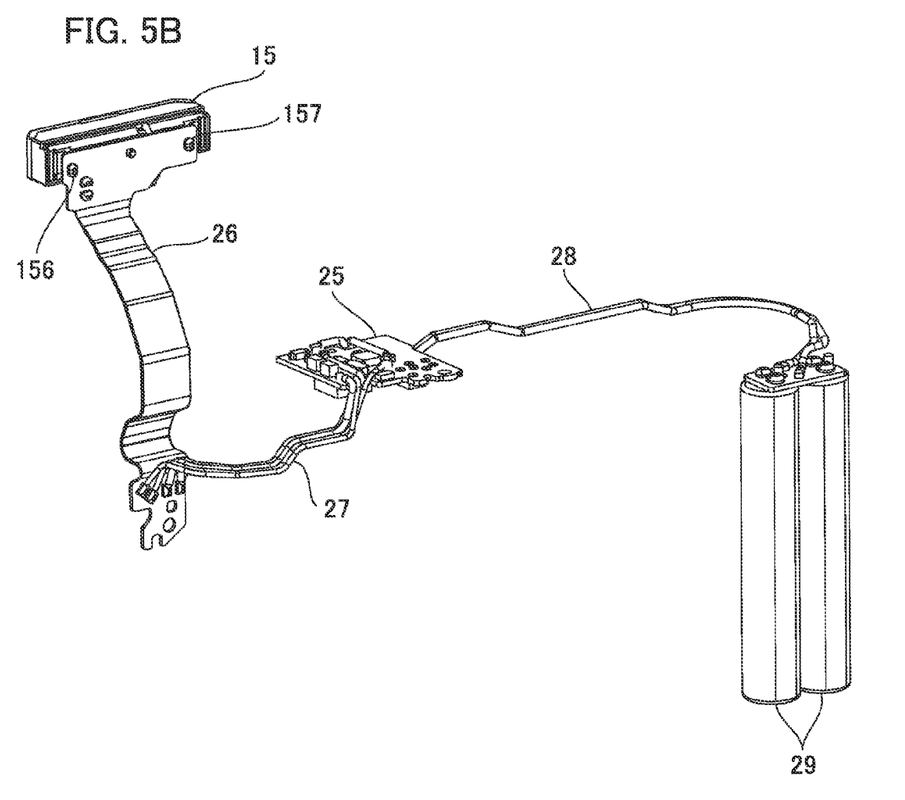

Next, the electrical connection between the strobe light emitting unit 15 and a strobe control substrate 25 installed in the case of the digital camera 1 will be described with reference to FIG. 5. FIG. 5A is an exploded perspective view of the strobe light emitting unit 15. FIG. 5B is a perspective view illustrating connection relationship between the strobe light emitting unit 15 and the strobe control substrate 25, and for convenience of explanation, the other members are omitted. As shown in FIG. 5A, the strobe light emitting unit 15 comprises a protector 151, a xenon tube 152, a reflector 153, a holder 154, a trigger coil 155, and two terminal plates 156 and 157.

The xenon tube 152 and the reflector 153 are members constituting the light source unit, and incorporated in the holder 154 so as to abut against each other. A terminal of the xenon tube 152 is soldered to the terminal plates 156 and 157 press-fitted for the holder 154, and is fixed to the holder 154. At this time, the reflector 153 abuts against the output terminal of the trigger coil 155 insert molded in the holder 154. Finally, the strobe light emitting unit 15 is completed by incorporating the protector 151 into the holder 154.

Four terminals of the strobe light emitting unit 15 are electrically connected to the strobe control substrate 25 through a flexible wiring member and a lead wire group. The four terminals are the terminal plates 156 and 157, an input terminal of the trigger coil 155 exposed from the holder 154, and a GND terminal, and are soldered to one end of a trigger flexible substrate 26 as shown in FIG. 5B. A light emitting unit side lead wire group 27 is soldered to the other end of the trigger flexible substrate 26, and is connected to the strobe control substrate 25. Furthermore, the strobe control substrate 25 is connected to a main condenser 29 by a condenser side lead wire group 28. When a trigger voltage is applied from an output terminal of the trigger coil 155 to the reflector 153 by a light emission start signal from the strobe control substrate 25, an electric charge charged in the main capacitor 29 flows out and the xenon tube 152 emits the light.

Figure 6A:
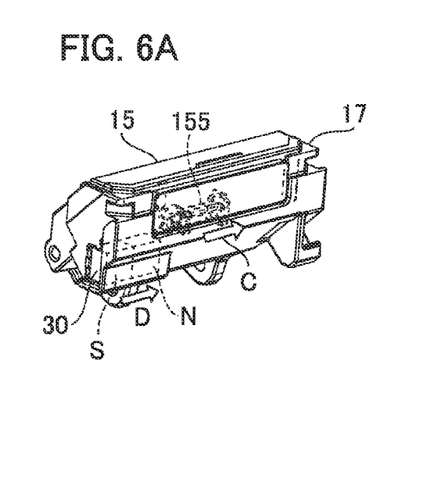
FIGS. 6A to 6C are diagrams illustrating a strobe holder.
Figure 6B:
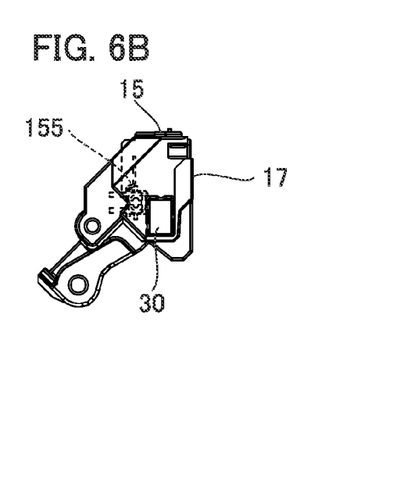

A method for detecting the position of the strobe holder 17 will be described with reference to FIG. 6. When the strobe light emitting unit 15 emits the light in the casing of the digital camera 1, the protector 151 and the like may melt depending on the heat generated during light emission. Therefore, only when the entire strobe light emitting unit 15 is exposed from the casing of the digital camera 1 by detecting the position of the strobe holder 17, it is necessary to perform the light emission control by the strobe control substrate 25. FIG. 6A is a perspective view illustrating the strobe light emitting unit 15 as viewed from a front side, and for convenience of explanation, a strobe cover 18 is omitted. FIG. 6B is a perspective view illustrating the strobe unit as viewed from a direction different from that in FIG. 6A.

Figure 6C:
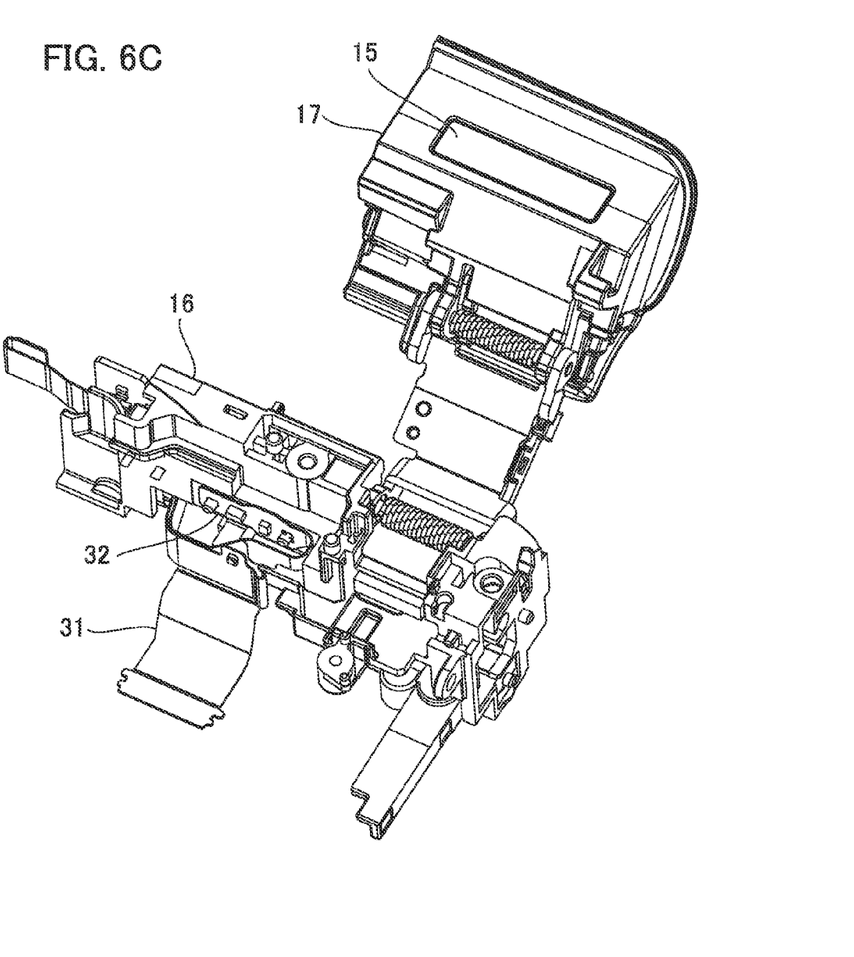

As shown in FIGS. 6A and 6B, a magnet 30 that is a magnetic member is inserted into the strobe holder 17 so that a N-pole of the magnet 30 is on the back side, and is fixed by an adhesive. In addition, as shown in FIG. 6C, a magnetic sensor 32 is fixed to the base member 16 to detect the magnetic flux density from magnet 30. The magnetic sensor 32 is mounted on a sensor flexible substrate 31 connected to a signal processing substrate (not shown). When the strobe holder 17 is in the popup state, a distance between the magnet 30 and the magnetic sensor 32 becomes large in comparison with the housed state to thereby reduce the magnetic flux density detected by the magnetic sensor 32. Furthermore, an output from the magnetic sensor 32 to the signal processing substrate is changed from ON to OFF when the detected magnetic flux density falls below a preset threshold value set in the magnetic sensor 32. Therefore, when the strobe holder 17 is close to the popup position, the threshold value of a surface magnetic flux density of the magnet 30 and the magnetic sensor 32 is adjusted so that the output of the magnetic sensor 32 is changed, to thereby be able to detect whether or not the strobe holder 17 is popped-up.

Next, the effects of the trigger coil 155 due to the orientation of the magnetic field of the magnet 30 will be described. In order to reduce a body size of the digital camera 1, it is preferred that the strobe holder 17 is reduced in size. As shown in FIG. 6A, the magnet 30 is close to the trigger coil 155 in the longitudinal direction of the strobe holder 17. In this manner, the strobe holder 17 can be arranged space-efficiently and can be reduced in size.

The trigger coil 155 has a mechanism in which the two coils (an input side coil and an output coil), which have a different number of windings, are wound around a rod-like core consisting of a conductive material. An AC voltage is applied to the input side coil, which has the lower number of windings, to thereby generate a magnetic field in the core. With an electromagnetic induction by the magnetic field, the output side coil, which has the higher number of windings, outputs the voltage that is more amplified than the input side coil. Since the voltage applied to the trigger coil 155 is the AC voltage, the direction of the magnetic field generated in the core of the trigger coil is the direction of arrow C in FIG. 5A with respect to a first wave of the AC voltage. In a second wave of the AC voltage and after, the direction of the magnetic field generated in the core alternates for each one wave.

On the structure of the trigger coil 155, when the trigger coil 155 is in close proximity to the magnet 30, the output voltage of the trigger coil 155 may be effected by the direction of the magnetic field of the magnet 30. As shown in FIG. 6A, when the N-pole side of the magnet 30 is in close proximity to the trigger coil 155, the direction of magnetic field of the magnet 30 becomes the direction of arrow D, and thus, the direction of magnetic field of the magnet 30 is the same direction (the arrow C) as the direction of the magnetic field generated in the core by the direction of the first wave of the magnetic field applied to the trigger coil 155. With this manner, the strength of the magnetic field of the magnet 30 is added to the strength of the magnetic field generated in the core of the trigger coil 155, and the maximum voltage of the first wave output by the trigger coil 155 is higher than a normal value.

Figure 7A:
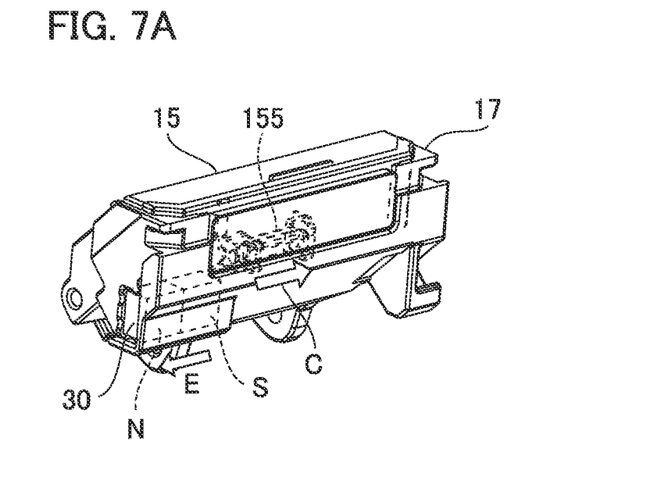
FIGS. 7A and 7B are diagrams illustrating a strobe holder.

As shown in FIG. 7A, when the S-pole side of the magnet 30 is in close proximity to the trigger coil 155, the direction of magnetic field of the magnet 30 becomes the direction of arrow E, and thus, the direction of magnetic field of the magnet 30 is the direction (the arrow C) opposite to the direction of the magnetic field generated in the core by the direction of the first wave of the magnetic field applied to the trigger coil 155. In this manner, the strength of the magnetic field generated in the core of the trigger coil 155 is weakened, and the maximum voltage of the first wave output by the trigger coil 155 is lower than the normal value.

When the maximum voltage of the first wave output by the trigger coil 155 is higher than the normal value, the maximum voltage can be adjusted by slowing down the switching speed in the strobe control substrate 25 on which a switching element controlling the light emitting of the xenon tube 152 is mounted so that the maximum voltage is in the normal value. However, when the maximum voltage of the first wave output by the trigger coil 155 is lower than the normal value, it is difficult to adjust the maximum voltage in the strobe control substrate 25 so as to become the normal value.

Figure 7B:
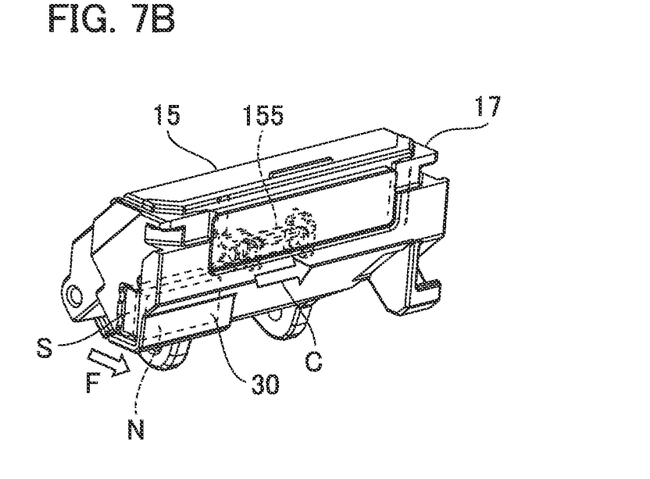

As shown in FIG. 7B, when the direction of magnetic field of the magnet 30 is the direction (arrow F) perpendicular to the direction of the magnetic field generated in the core of the trigger coil 155, the effect on the magnetic field generated in the trigger coil 155 is small. Thus, the output voltage of the trigger coil 155 is the same as the normal value. The invention is not limited to the configuration shown in FIG. 7B, and the effect on the magnetic field generated in the trigger coil 155 is small as long as the direction of magnetic field of the magnet 30 is perpendicular to the direction of the magnetic field generated in the core of the trigger coil 155. Note that, since the direction of magnetic field of the magnet 30 is the lateral direction of the magnet 30, a surface magnetic flux density of the magnet 30 is decreased compared to the case where the direction of magnetic field is the longitudinal direction. Thus, since the magnetic flux density from the magnet 30 detected by the magnetic sensor 32 is small in the detection position of the strobe holder 17, it is necessary to select the magnetic sensor 32 having the small threshold value. When the threshold value of the magnetic sensor 32 is small, the possibility of causing a false detection may be increased due to the effect of the magnetic flux density from the other magnetic material.

Furthermore, in the present embodiment, as shown in FIG. 6B, the magnet 30 is arranged so as not to overlap the projection in the longitudinal direction of the core of the trigger coil 155. In other words, the trigger coil 155 is arranged so as not to overlap the projection in the magnetic field direction of the magnet 30. In this manner, the effect on the output voltage of the trigger coil 155 on which the magnetic field of the magnet 30 has the effect can be reduced.

In the present embodiment, the position relationship between the magnet and the trigger coil 155 is set such that the direction of the magnetic field of the magnet 30 is not the direction opposite to the direction of the magnetic field generated in the core due to the first wave of the input voltage of the trigger coil 155. In this manner, the output voltage of the trigger coil 155 can be adjusted to the normal value.

According to the invention, in the image pickup apparatus that comprises the strobe light emission unit configured to perform the popup detection using the magnet, the occurrence of light emission failure due to the effect of the magnetic field of the magnet provided on the light emitting unit can be prevented.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-243689, filed on Dec. 2, 2014, which is hereby incorporated by reference herein in its entirety.

What is claimed is:

1. An image pickup apparatus that comprises a mechanism that causes a light emitting unit for illuminating to move from a storage position at which the light emitting unit is housed in the apparatus body to a light emission enabled position at which the light emitting unit protrudes outside of the apparatus body, the apparatus comprising:
a holding member that holds the light emitting unit;
a trigger coil that is provided in the light emitting unit; and
a magnetic member that is held by the holding member,
wherein the magnetic member is arranged adjacent to the trigger coil so that a direction of a magnetic field of the magnetic member is not a direction opposite to a direction generated in the trigger coil by a first wave of a voltage input to the trigger coil.

2. The image pickup apparatus according to claim 1, wherein the direction of the magnetic field of the magnetic member is the same direction as the direction generated in the trigger coil by the first wave of the voltage input to the trigger coil.

3. The image pickup apparatus according to claim 1, wherein the direction of the magnetic field of the magnetic member is the direction perpendicular to the direction generated in the trigger coil by the first wave of the voltage input to the trigger coil.

4. The image pickup apparatus according to claim 1, wherein the magnetic member is arranged in proximity to the trigger coil in a longitudinal direction of the holding member.

5. The image pickup apparatus according to claim 1, wherein the trigger coil is arranged so as not to overlap a projection of the magnetic field direction of the magnetic member.

6. The image pickup apparatus according to claim 1, wherein the trigger coil applies a trigger voltage to a light source included in the light emitting unit.

7. The image pickup apparatus according to claim 1, further comprising:
a detecting unit that detects whether or not the light emitting unit is in a light emitting enable position by detecting a magnetic flux density from the magnetic member.

* * * * *